(12) United States Patent
Kitajima et al.

(10) Patent No.: US 10,473,140 B2
(45) Date of Patent: Nov. 12, 2019

(54) INSERT NUT AND FASTENING DEVICE

(71) Applicant: CANON KABUSHIKI KAISHA, Tokyo (JP)

(72) Inventors: Kazushi Kitajima, Yokohama (JP); Hiroshi Hiura, Kashiwa (JP); Kazuhisa Okuda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 174 days.

(21) Appl. No.: 15/620,971

(22) Filed: Jun. 13, 2017

(65) Prior Publication Data

US 2017/0370396 A1 Dec. 28, 2017

(30) Foreign Application Priority Data

Jun. 27, 2016 (JP) .................................. 2016-127008

(51) Int. Cl.
*F16B 37/04* (2006.01)
*F16B 31/04* (2006.01)
*F16B 39/00* (2006.01)

(52) U.S. Cl.
CPC .......... *F16B 37/044* (2013.01); *F16B 31/043* (2013.01); *F16B 37/041* (2013.01); *F16B 37/04* (2013.01); *F16B 39/00* (2013.01)

(58) Field of Classification Search
CPC ...... F16B 31/043; F16B 37/04; F16B 37/041; F16B 37/044; F16B 39/00; B21K 1/70
USPC .......... 411/61, 82, 178–181, 432, 546, 903; 470/23, 25

See application file for complete search history.

(56) References Cited

U.S. PATENT DOCUMENTS

| 991,517 | A | * | 5/1911 | Kennedy | ............... E04B 1/4121 52/708 |
| 3,383,975 | A | * | 5/1968 | Cushman | ............... F16B 9/026 411/92 |
| 3,405,591 | A | * | 10/1968 | Neuschotz | ........... F16B 37/122 403/288 |
| 4,097,061 | A | * | 6/1978 | Dietlein | .................. A63C 5/06 280/607 |

(Continued)

FOREIGN PATENT DOCUMENTS

| CN | 103362924 A | 10/2013 |
| CN | 103398055 A | 11/2013 |

(Continued)

OTHER PUBLICATIONS

Chinese Office Action issued in corresponding Chinese Application No. 201710501534.6 dated Mar. 25, 2019.

*Primary Examiner* — Roberta S Delisle
(74) *Attorney, Agent, or Firm* — Venable LLP

(57) ABSTRACT

An insert nut includes a cylindrical portion into which a bolt is removably insertable. An inner periphery of the cylindrical portion includes a first region, a second region and a third region which are provided in the order named from an upstream side to a downstream side with respect to an insertion direction of the bolt at an inner periphery thereof. The first region and the third region include a female screw portion threadably engageable with the bolt. The second region has a minimum inner diameter larger than $D1+2\times h1\times 0.3$, where D1 is an inner diameter of the female screw portion in the first region at a screw thread position and h1 is a height of a screw thread of the female screw portion in the first region.

20 Claims, 10 Drawing Sheets

(56) References Cited

U.S. PATENT DOCUMENTS

| | | | | |
|---|---|---|---|---|
| 4,143,579 A * | 3/1979 | Ziaylek, Jr. | ............ | F16B 37/122 411/42 |
| 4,729,705 A * | 3/1988 | Higgins | .................... | F16B 5/01 411/174 |
| 4,730,968 A * | 3/1988 | Diperstein | ............ | F16B 37/122 411/178 |
| 4,822,223 A * | 4/1989 | Williams | .............. | F16B 37/122 403/268 |
| 4,842,462 A * | 6/1989 | Tildesley | .............. | F16B 37/122 249/59 |
| 4,941,788 A * | 7/1990 | Highfield | .............. | F16B 37/122 411/178 |
| 4,971,497 A * | 11/1990 | Stoffer | .................... | F16B 37/04 411/108 |
| 6,024,523 A * | 2/2000 | Oudmayer | ............ | F16B 37/122 411/111 |
| 6,474,918 B1 * | 11/2002 | Kelch | .................... | F16B 35/047 411/180 |
| 6,692,207 B1 * | 2/2004 | Bailey | .................... | F16B 37/122 411/180 |
| 7,465,136 B2 * | 12/2008 | Nagayama | ................ | B21K 1/56 411/178 |
| 8,985,925 B2 * | 3/2015 | Lan | ........................ | F16B 33/004 411/180 |
| 2002/0176763 A1 * | 11/2002 | Lin | ........................ | F16B 13/06 411/178 |
| 2006/0013671 A1 * | 1/2006 | Lauderbaugh | ........ | F16B 37/127 411/178 |
| 2013/0266397 A1 | 10/2013 | Amano et al. | | |

FOREIGN PATENT DOCUMENTS

| | | |
|---|---|---|
| EP | 1 375 933 A1 | 2/2004 |
| JP | 2010-048308 A | 3/2010 |

* cited by examiner (a)

(b)

(c)

(d)

INSERT NUT AND FASTENING DEVICE

FIELD OF THE INVENTION AND RELATED ART

The present invention relates to an insert nut for forming a female screw portion b being embedded in a base material formed of a synthetic resin material, a metal or the like.

Conventionally, in order to fasten a bolt to the synthetic resin material by threadably engaging the bolt with the synthetic resin material, a screw for the synthetic resin material, such as a tapping screw having a rough screw thread pitch is used in some cases. However, strength of a female screw portion directly self-tapped in a hole of the base material formed of the synthetic resin material is not so strong (large). For this reason, when the screw for the synthetic resin material is repetitively mounted (inserted) into and demounted (removed) from the hole of the synthetic resin material, there is a possibility that the female screw portion is plastically deformed to result in shearing failure or that the female screw portion causes breakdown failure due to creep. In order to prevent such a failure (breakage) of the female screw portion, a method in which the strength of the female screw portion is ensured by mounting a metal(-made) insert nut into the synthetic resin (arrow-made) base material in advance has become widespread.

Japanese Laid-Open Patent Application (JP-A) discloses an insert nut which is press-fitted into the synthetic resin base material while applying heat to the base material and which includes an uneven (projection and recess)-shaped portion at a peripheral side portion, a female screw portion at an inner diameter portion, and a flange at an end portion.

Incidentally, when the insert nut of this type is press-fitted into the synthetic resin base material and a bolt is fastened to the insert nut via a fastened object, the bolt is fastened in the following manner. When the bolt is fastened, via the fastened object, to a part (component) placed in a state in which the insert nut is press-fitted in the base material formed of the synthetic resin material, a reaction force (axial direction tension, i.e., axial force) from a screw thread of the insert nut and the fastened object acts on the bolt. Thus, a fastening force acts on the bolt, so that fastening is ensured.

However, it has been generally known that when various disturbances such as vibration, impact, a temperature change and the like are exerted on the fastened part, loosening of the bolt generates. Further, in the case where respective parts are used in a state in which the fastened object formed of the synthetic resin material is sandwiched between the bolt and the insert nut, a difference in linear expansion coefficient among the respective parts generates. That is, there can be difference in linear expansion coefficient between the bolt which is metal and the fastened object (fastened member) formed of the synthetic resin material, and there can be a difference between a material of the insert nut and a material of the bolt. Depending on a temperature fluctuation in operation environment, a fluctuation in axial force is generated by repetition of thermal expansion and thermal contraction between the bolt (insert nut) and the fastened part, so that the bolt is pulled or loosened in the axial direction of the bolt and thus the axial force is increased or decreased in some instances. In this case, there is a possibility that the bolt is returned in a slight amount and is rotated, so that a degree of the loosening of the bolt is increased in some instances.

However, as regards the insert nut disclosed in JP-A 2010-48308, prevention of the above-described loosening of the fastened bolt has not been particularly taken into consideration. As a means for preventing the loosening of the bolt, for example, a method of applying an adhesive onto the bolt after the bolt is fastened and a method of using a spring washer would be considered. However, there was problems that the number of steps of an assembling operation in either case and that there is a need to take countermeasure against the loosening of the bolt in a bolt side other than the side where the insert nut is disposed.

SUMMARY OF THE INVENTION

A principal object of the present invention is to provide an insert nut and a fastening device which are capable of reducing a degree of generation of loosening of a fastened bolt due to disturbances such as vibration and a temperature change while using only a general-purpose bolt without increasing the number of assembling steps.

According to an aspect of the present invention is to provide an insert nut comprising: a cylindrical portion into which a bolt is removably insertable, wherein an inner periphery of the cylindrical portion includes a first region, a second region and a third region which are provided in the order named from an upstream side to a downstream side with respect to an insertion direction of the bolt at an inner periphery thereof, wherein the first region and the third region include a female screw portion threadably engageable with the bolt, and wherein the second region has a minimum inner diameter larger than $D1+2 \times h1 \times 0.3$, where $D1$ is an inner diameter of the female screw portion in the first region at a screw thread position and $h1$ is a height of a screw thread of the female screw portion in the first region.

Further features of the present invention will become apparent from the following description of exemplary embodiments with reference to the attached drawings.

DESCRIPTION OF EMBODIMENTS

First Embodiment

Figure 1:
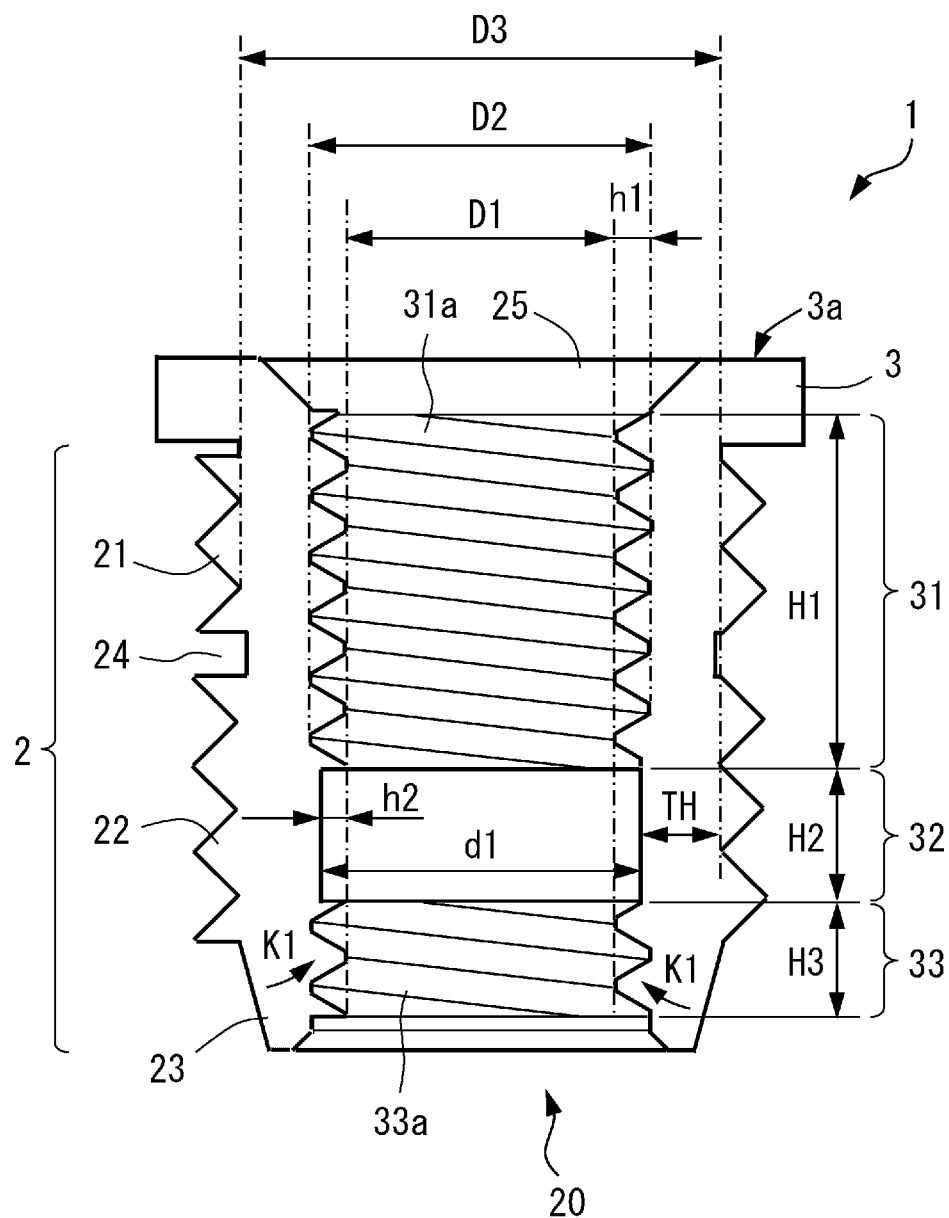
FIG. 1 is a schematic sectional view of an insert nut according to First Embodiment.

First Embodiment of the present invention will be described in detail with reference to FIGS. 1 to 5. An insert nut 1 in this embodiment is embedded in a base material 40 formed of a synthetic resin material and fastens a fastened member 60 between itself and a bolt 50. In this embodiment, as the bolt fastened to the insert nut 1, an M3 standard bolt which is a metric coarse (screw) thread defined by JIS B0205 or the like is used, but the present invention is not limited thereto. Further, an inner diameter of a female (interval) screw means a direction between opposing screw thread ends, a valley diameter of the female screw means a diameter between opposing valley bottoms of the female screw, and an effective diameter of the female screw means an imaginary cylindrical diameter in which a width of the screw and a width of a thread groove are equal to each other. Further, the insert nut 1 is usable in, for example, apparatuses, such as a copying machine, a printer, a plotter, a facsimile apparatus, a printing machine, a binding apparatus and a camera, which include a resin(-made) casing and in which screw fastening is made using the insert nut.

In this embodiment, a fastening device 70 for fastening a fastened member 60 is constituted by the insert nut 1 and a bolt assembled with a bolt 50. In the fastening device 70, an inserting direction of the bolt 50 into the insert nut 1 is downward direction, and a removing (demounting) direction of the bolt 50 from the insert nut 1 is an upward direction.

Figure 2:
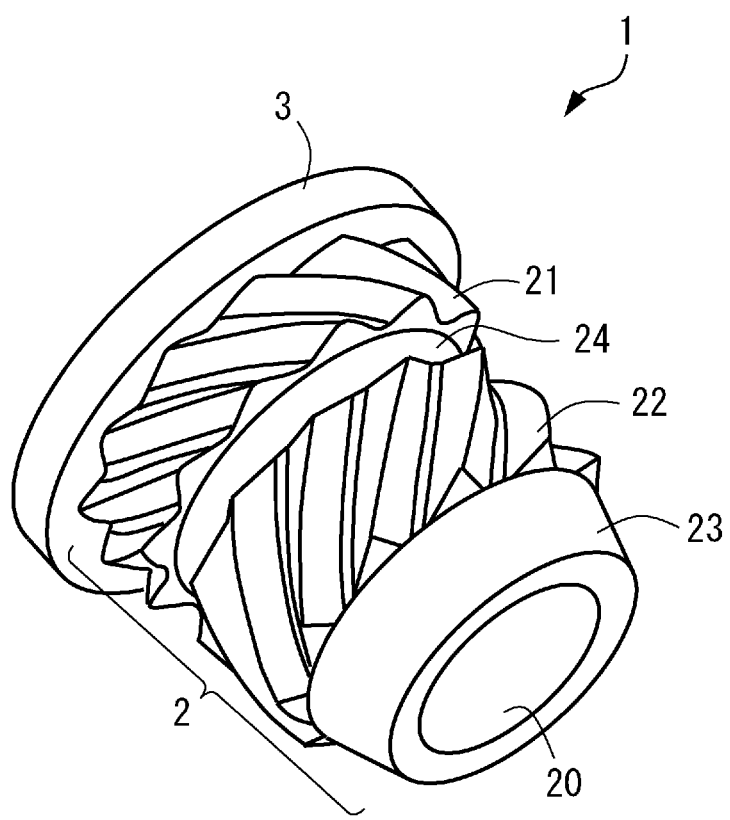
FIG. 2 is a schematic perspective view of the insert nut in First Embodiment.

As shown in FIGS. 1 and 2, the insert nut 1 includes a cylindrical portion 2 having a substantially cylindrical shape and embedded into a base material 40 (FIG. 3) and includes a flange 3 formed at one end portion of the cylindrical portion 2. The cylindrical portion 2 is provided with a hole (inner peripheral portion) 20. At an outside surface of the cylindrical portion 2, a first knurling portion 21, a second knurling portion 22 and a guiding inclined surface portion 23 are formed. The first knurling portion 21 is disposed in an upstream side with respect to a press-fitting (inserting) direction of the insert nut 1 into the base material 40. The second knurling portion 22 is disposed in a downstream side with respect to the press-fitting direction of the insert nut 1 into the base material 40. Each of the first and second knurling portions 21 and 22 is in a ridge-like helical shape such that a plurality of mountains and valleys (crests and roots) are alternately provided in a circumferential direction. A groove portion 24 is provided between the first and second knurling portions 21 and 22. Each of the knurling portions 21 and 22 is mounted in the base material 40 in a manner such that when the cylindrical portion 2 is thermally press-fitted into the base material 40, a synthetic resin material enters between an uneven shape portion of a surface of each position. The guiding inclined surface portion 23 has a tapered shape such that a diameter thereof in a free end side becomes small, and constitutes a guiding portion when the insert nut 1 is thermally press-fitted into the bolt 50. In this embodiment, the cylindrical portion 2 has the substantially cylindrical shape, but the shape thereof is not limited thereto. For example, the shape of the cylindrical portion 2 may only be required to be a shape, such as a plate shape, a block shape or a spherical shape, which includes the hole 20 into which the bolt 50 is insertable and from which the bolt 50 is removable.

The cylindrical portion 2 includes a first region 31, a second region 32 and a third region 33 provided in a named order from an upstream side toward a downstream side of the inserting direction of the bolt 50 at the inner peripheral portion of the hole 20. In a side upstream of the first region 31 with respect to the inserting direction of the bolt 50, an inducing (guiding) portion 25 is provided. The inducing portion 25 opens toward an outside in the flange 3 and has a tapered shape along which the bolt 50 is guided when the bolt 50 is inserted.

The first region 31 and the third region 33 include female screw portions 31a and 33a, respectively, with which the bolt 50 is threadably engageable. The female screw portion 31a (first female screw portion 31a) in the first region 31 and the female screw portion 33a (second female screw portion 33a) in the third region 33 are formed by a rolled thread tap or a cut thread tap. The first female screw portion 31a is formed continuously from the inducing portion 25. The third female screw portion 33a is formed coaxially with the first female screw portion 31a at the hole 20 in a position where the third female screw portion 33a is spaced from the first female screw portion 31a via the second region 32 with respect to the inserting direction of the bolt 50, and is formed so that the bolt 50 is threadably engageable with the first female screw portion 31a and the third female screw portion 33a simultaneously. The third female screw portion 33a not only has the same diameter as the first female screw portion 31a but also has the same pitch and the same phase pitch as the first female screw portion 31a.

The second region 32 has a minimum inner diameter d1 larger than $D1+2 \times h1 \times 0.3$, where D1 is an inner diameter of the first female screw portion 31a at a screw thread position and h1 is a height of a screw thread of the first female screw portion 31a. In this embodiment, the second region has a circumferential surface shape such that the bolt 50 is insertable into and removable from the second region and the inner diameter d1 is larger than an inner diameter D1 of the female screw portions 31a and 33a in the first and third regions 31 and 33. That is, the second region 32 at least partly includes a portion (for example, a helical screw thread-shaped groove into which the bolt 50 is removably insertable) with a diameter not less than an outer diameter of the bolt 50. The screw thread of the bolt 50 passes through the portion, so that an interference between the screw thread of the bolt 50 and the second region 32 is substantially prevented and the bolt 50 is removably insertable into the second region.

Figure 3:
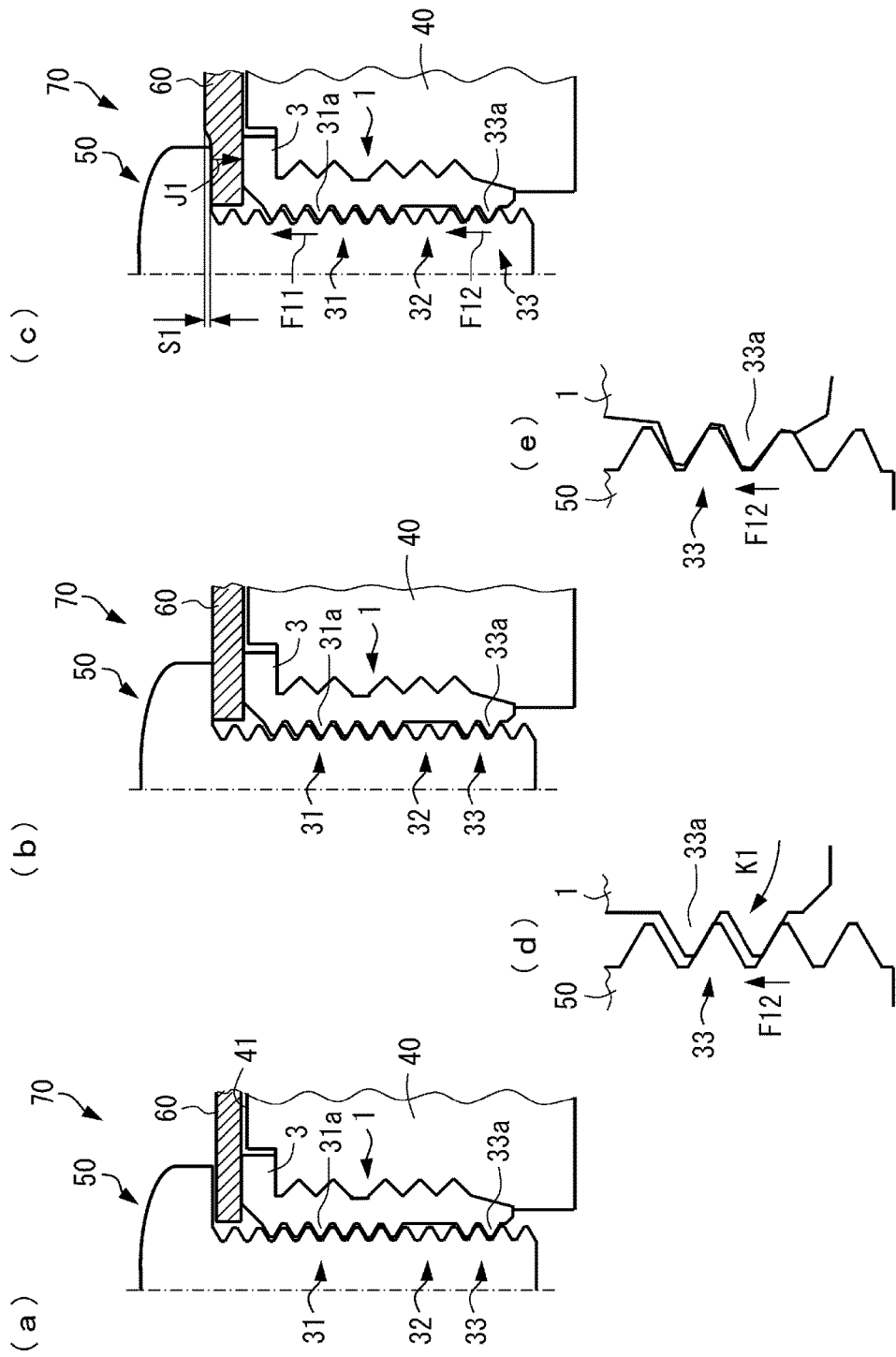
In FIG. 3, (a) to (e) are sectional views each showing a fastening device in which a bolt is threadably engaged with the insert nut in First Embodiment, wherein (a) shows a state before a head portion of the bolt contacts a fastened member, (b) shows a state before the head portion of the bolt contacting the fastened member is fastened, (c) shows a state after the bolt is fastened, (d) is an enlarged view of (b) of FIG. 3, and (e) is an enlarged view of (d) of FIG. 3.

The insert nut 1 is press-fitted into a prepared hole provided in the base material 40, which is a member in which the insert nut 1 is to be mounted, by mold insert molding, cold (normal-temperature) press-fitting or heat press-fitting with a heating means such as a heater or ultrasonic heating. In FIG. 3, (a) to (e) are sectional views for illustrating a state in which the insert nut 1 is embedded into the base material 40 and the bolt 50 is fastened to the insert nut 1 via the fastened member 60. In FIG. 3, (a) shows a state before the bolt 50 is completely fastened. In FIG. 3, (b) shows a state in which the bolt 50 is fastened to the extent that a head portion of the bolt 50 contacts the fastened member 60, and (d) is an enlarged view of the third region 33 in the state of (b). In FIG. 3, (c) shows a state in which the bolt 50 is fastened until the head portion of the bolt 50 compresses the fastened member 60, and (e) is an enlarged view of the third region 33 in the state of (d). An upper surface 3a of the flange 3 of the insert nut 1 projects from an upper surface 41 of the base material 40 in a projected shape.

In the case where the upper surface 3a of the flange 3 of the insert nut 1 is below the upper surface 41 of the base material 40 (not shown), during fastening of the bolt 50, the following problems exist.

1. In the case where the fastened member 60 is a thin plate, the fastened member 60 is flexed and deformed.
2. A position of the fastened member 60 is determined by the upper surface 41 of the base material 40, and therefore, a gap generates between the fastened member 60 and the upper surface 3a of the flange 3 of the insert nut 1. At this time, a fastening force of the bolt 50 acts so that the insert nut 1 is pulled off from the upper surface 41 of the base material 50 and therefore causes jack-up such that the insert nut 1 is removed (disengaged).

For this reason, in this embodiment, the upper surface 3a of the flange 3 of the insert nut 1 is provided so that the upper surface 3a is flush with the upper surface 41 of the base material 40 or is somewhat projected from the upper surface 41 of the base material 40. However, even when the fastening device is used in the state in which the upper surface 3a of the flange 3 of the insert nut 1 is below the upper surface 41, an effect of the present invention can be obtained. Flatness of both surfaces, i.e., the upper surface (front surface side) 3a and a lower surface (back surface side) of the flange 3 may preferably be 0.03 mm to 0.05 mm as an example. A plate thickness of the flange 3 may preferably be 0.5 mm to 1.0 mm as an example.

Next, the outer diameter of the flange 3 of the insert nut 1 will be described.

In the case where the outer diameter of the flange 3 is smaller than a diameter of a bearing surface of the head portion of the bolt 50, when fastening of the bolt 50 progresses, there is a liability that the fastened member 60 is deformed by being pressed by an outer peripheral portion of the bearing surface of the bolt 50. Particularly, the fastened member 60 is the thin plate, there is a possibility that a degree of the deformation of the thin plate is not restored even when the bolt 50 is loosened. Therefore, in this embodiment, the outer diameter of the flange 3 of the insert nut 1 is set at a value not less than a diameter of a contact portion of the bolt 50 so that the contact portion of the bolt 50 with the fastened member 60 is in the neighborhood of the outer peripheral portion of the flange 3 of the insert nut 1.

The outer diameter of the flange 3 of the insert nut 1 may preferably be not less than the diameter of the contact portion (or the diameter of a flange, the bearing surface or the like of the bolt 50) of an outer diameter portion of the head portion of the bolt 50, but may also be smaller than the diameter of the contact portion when an amount thereof is slight.

The knurling portions 21 and 22 of the insert nut 1 at the outer peripheral surface prevent movement of the insert nut 1 together with the bolt 50 when the insert nut 1 is mounted and then the bolt 50 is inserted and rotationally fastened to the insert nut 1. A knurling shape of the insert nut 1 at the outside surface is illustrated as an example of the case where the knurling shape is divided into the first knurling portion 21 and the second knurling portion 22 so that twist directions (mountain-valley extending direction) of the knurling portions are different from each other, but the knurling shape is not limited thereto. The knurling shape may also be a knurling shape such that the twist directions are the same or a so-called crisscross knurling shape such that the twist directions cross each other. The knurling shape is constituted so that the insert nut 1 is entangled with the synthetic resin material in a partly melted state or a softened state by the first knurling portion 21, the second knurling portion 22 and the groove portion 24 which are the uneven portion as a rotation-preventing means.

Referring to the sectional view of the insert nut 1 shown in FIG. 1, a shape of a female screw or the like of the insert nut 1 at the head portion 20 which is a feature of the present invention will be described. The inducing portion 25 is formed in an inclined surface (portion) shape so that the screw thread of the bolt 50 easily engages with the screw thread of the first female screw portion 31a.

Necessary conditions of respective region widths of the first region 31, the second region 32 and the third region 33 will be described. In general, as a necessary engagement length at a general-purpose fastening portion, it has been known that the length is not less than (bolt outer diameter)× 1.0. Accordingly, the length of the female screw portions 31a and 33a which is the sum of a region width H1 of the first region 31 in a flange 3 side and a region width H3 of the third region 33 in a free (leading) end side is required to satisfy a relationship that the length is not less than (bolt outer diameter)×1.0.

$$H1+H3 \geq ((\text{bolt outer diameter}) \times 1.0) \quad \text{(formula 1)}$$

The region width H3 of the third region 33 is a portion where the third female screw portion 33a engages with the screw thread of the bolt 50 and receives the fastening force, and therefore, a screw thread portion with a width (length) which is not less than two pitches corresponding to two full circumferences.

$$H3 \geq (\text{bolt screw pitch}) \times 2 \quad \text{(formula 2)}$$

Then, the region width H1 of the first region 31 is set so as to satisfy the following formula 3.

$$H1 \geq ((\text{bolt outer diameter}) \times 1.0) - H3 \quad \text{(formula 3)}$$

The region width H2 of the second region 32 is a region for dividing the female screw of the insert nut 1 into the first female screw portion 31a and the third female screw portion 33a, and as a length in which the female screw does not engage with the screw thread of the bolt 50, a screw thread width not less than two pitches corresponding to two fall circumferences. For this reason, the region width H2 is set so as to satisfy the following formula 4.

$$H2 \geq (\text{bolt screw pitch}) \times 2 \quad \text{(formula 4)}.$$

As described above, as regards the respective region widths of the first region 31, the second region 32 and the third region 33, there is a need that respective conditions of the formulas 1 to 5 are satisfied.

Next, the insert nut as the M3 standard screw which is the metric coarse screw thread defined by JIS B 0205 (ISO 724: 1993) or the like employed in this embodiment will be described in terms of dimensional values of the respective portions.

As regards a necessary engaging length, in the formula 1, the bolt outer diameter is 3 mm, and therefore, the length of the female screw portions 31a and 33a which is the sum of the region width H1 of the first region 31 and the region width H3 of the third region 33 is H1+H3≥3. The region width H3 of the third region 33 is H3≥0.5 mm×2 since a screw pitch of the bolt 50 in the formula 2 is 0.5 mm, and in this case, a minimum value is selected, so that H3=1 mm. As regards the region width h1 of the first region, from the above-described value and the formula 3, H1≥3−H3≥2 mm, and therefore in this case, H1=2.5 mm is selected. As regards the region width H2, in the formula 4, the screw pitch of the bolt 50 is 0.5 mm, and therefore H2≥0.5 mm×2 is satisfied, and in this case, a minimum value is selected, so that H2=1 mm.

Other peripheral shape values of the insert nut 1 are set in the following manner. An outer diameter of the flange 3 of the insert nut 1 is set at 5.5 mm which is the same as the diameter of the head portion of the bolt 50 (small pan (round) head screw) used, and a thickness of the flange 3 of the insert nut 1 is set at 0.5 mm. The first knurling portion 21 is 4.7 mm in outer diameter, 0.8 mm in pitch and 1.5 mm in region width with respect to an axial direction. The second knurling portion 22 is 4.4 mm in outer diameter, 0.8 mm in pitch and 2 mm in region width with respect to the axial direction. The groove portion 24 is 0.5 mm in width and 4.7 mm in outer diameter, and when the guiding inclined surface portion 23 is set at 0.7 mm, a full length of the insert nut 1 is 5 mm.

At the hole portion 20 of the insert nut 1, in the above-mentioned description, the region width H1 of the first region 31 is 2.5 mm, the region width H2 of the second region 32 is 1 mm, and the region width of the third region 33 is 1 mm. For this reason, (full length: 5 mm)−(2.5 mm+1 mm+1 mm)=0.5 mm, so that this value is divided into the inducing portion 25 and a stepped end portion of the third region 33.

In this embodiment, the region width H2 portion in the second region 32 has a cylindrical shape such that for example, there is no mountain and of valley of the female screw and an inner diameter thereof is larger than the outer diameter of the screw portion of the bolt 50 so that the bolt 50 does not substantially interfere with the region width H2 portion when the bolt 50 is rotated and inserted into the insert nut 1. That is, in this embodiment, the bolt 50 is the M3 standard screw (outer diameter: 2.874–2.980 mm), and therefore, 93.0 mm which is the same as a female screw valley diameter of the female screw portions 31a and 33a is an inner diameter D1 of a recessed portion of the second region 32.

As a material of the insert nut 1, it is desirable that a material which is excellent in corrosion resistance, extendability, rolling property and processing property and which is easy to be properly deformed while ensuring strength of the screw thread is used. Specifically, a material which has a longitudinal elastic modulus value (Young's modulus E) lower than a longitudinal elastic modulus value of steel (SS400 or the like) as a general-purpose nut material and which has the longitudinal elastic modulus value lower than a longitudinal elastic modulus value (103 KN/mm$^2$) of brass (C2680) which is the general-purpose insert nut material. That is, for example, a 5000 series aluminum alloy or the like of 70 KN/mm$^2$ in longitudinal elastic modulus may preferably be used. For this reason, in this embodiment, the insert nut 1 is formed of an aluminum alloy.

The aluminum alloy as the material of the insert nut 1 is more excellent in the following points than other materials.

1. The aluminum alloy is excellent in malleability, and therefore, is suitable for fine press forming.
2. The aluminum alloy is subjected to processing hardening treatment or surface hardening treatment such as an alumite method, so that the strength of the screw portion and the knurling portions can be enhanced.
3. The aluminum alloy has small specific heat and a good thermal conductivity, and during thermal press-fitting, heat of a heater is easily conducted to the insert nut 1, and therefore, a heating time can be shortened.
4. Compared with brass, the aluminum alloy is inexpensively available in terms of costs per unit volume inclusive of a difference in specific gravity.

Next, action during fastening and fixing of the fastened member 60 by a combination of the insert nut 1 of the present invention with the bolt 50 which are used as the fastening device 70 will be described using FIG. 3.

When the insert nut 1 is press-fitted into the base material 40 and the bolt 50 is fastened to the insert nut 1 while sandwiching the fastened member 60 between itself and the insert nut 1 as shown in (b) of FIG. 3, the head portion of the bolt 50 starts to contact the fastened member 60. That is, a gap between the head portion of the bolt 50 and the fastened member 60 reaches zero, and the fastening of the fastened member 60 by the insert nut 1 and the bolt 50 starts.

From this state, when the bolt 50 is fastened to a predetermined fastening torque, the fastened member 60 is compressively deformed in a depth S1 although an amount of deformation is small, so that a state of (c) is formed and the fastening is completed. At this time, the fastened member 60 causes, as a reaction force thereof, a downward load J1 to act on the upper surface of the insert nut 1. The bolt 50 causes upward loads F11 and F12 to act on the first and third female screw portions 31a and 33a, respectively, of the insert nut 1 so as to achieve a balance between the downward load J1 and the upward loads F11 and F12. When the upward load F12 acts on the third female screw portion 33a, the screw thread of the insert nut 1 in the third region 33 presses the screw thread of the bolt 50 in an arrow K1 direction shown in (d) of FIG. 3. At this time, as shown in (e) of FIG. 3, the screw thread of the insert nut 1 in the third region 33 is slightly inclined in the arrow K1 direction ((d) of FIG. 3), with the result that corner portions of screw thread tops of the insert nut 1 in the third region 33 and the bolt 50 bite into opposing screw thread surfaces.

By this biting, a phenomenon that the bolt 50 is rotated and loosen is suppressed. External forces acting on the insert nut 1 are summarized as the following two points from the above description.

1. Fastening formula of fastened member 60: J1=F11+F12
2. Biting acting on between screw thread surfaces between the bolt 50 and the third female screw portion 33a: K1

Next, with regard to the biting K1 acting on between the above-described screw thread surfaces and the fastening force (J1=F11+F12) to the fastened member 60, a result obtained by a simulation using a structural analysis will be described.

The fastening force (J1=F11+F12) to the fastened member 60 changes depending on setting of a fastening torque (rotational torque) of the bolt 50. As a general torque value, in the case of the M3 standard bolt, 0.6 Nm to 0.8 Nm are used, and specifically, 0.6 Nm is used in the case of a synthetic resin material and 0.8 Nm is used in the case of metal. Thus, when the bolt 50 is fastened to the insert nut 1, on the insert nut 1, the forces J1, F11 and F12 acts at the upper surface of the flange 3, the screw thread of the female screw portion 31a and the screw thread of the third female screw portion 33a, respectively.

As regards the fastening torque during the fastening of the bolt 50 to the insert nut 1, in the case where the M3 standard bolt is used, the fastening torque is set at 0.6 Nm, and therefore, a relationship between the bolt and the torque is defined by the following known screw formula, so that an axial force acting on the bolt can be obtained.

Fastening torque=(axial force)×{(effective bolt diameter)/2×((bolt screw thread friction coefficient/cos α+tan β)+(bolt head portion friction coefficient)×(effective bolt head portion diameter)/2}

In this formula, the respective parameters are as follows.
Effective bolt diameter=2.675 mm (M3 bolt screw portion)
Bolt screw thread friction coefficient=0.1
Bolt head portion friction coefficient=0.1
Effective bolt head portion diameter=4.377 mm (M3 bolt head portion)
α=30° (half angle of screw thread)
β=(lead angle of screw thread)

tan β=pitch/(n×(effective bolt diameter))=0.5/n×2.675)

When these values are substituted in the above force formula, the axial force (fastening torque) acting on the bolt 50 is 1325 N.

Next, materials of the respective members as a premise of the simulation will be described. As the material of the insert nut 1, the aluminum alloy is set since there are advantages as described above. As the material of the fastened member 60, a zinc-electroplated steel plate is set. The zinc-electroplated steel plate possesses, compared with a general-purpose steel plate, features such that the zinc-electroplated steel plate is excellent in corrosion resistance and has a very good processing property and is not readily damaged and that it is excellent in application (coating) property and is inexpensive and can be mass-produced, and has become widespread.

As the material of the base material 40, it is possible to apply various engineering plastics such as ABS, PC, PET and the like. However, the analysis in this embodiment is an analysis of the forces between the insert nut 1 and the fastened member 60, and therefore, the material of the base material 40 is not particularly required to be set for carrying out the simulation.

As described above, the axial force of 1325 acts on the bolt 50, and deformation of the insert nut 1 is subjected to the simulation, the screw thread of the female screw portion 33a in the third region 33 is displaced from the state of (d) of FIG. 3 in the arrow K1 direction. Then, as shown in (e) of FIG. 3, the female screw portion 33a is slightly inclined in the arrow K1 direction, with the result that the corner portions of the screw thread tops of the female screw portion 33a and the bolt 50 bite into the opposing screw thread surfaces. The force thereof acts in a direction of fastening the bolt 50.

That is, the fastening force is (J1=F11+F12=1325 N), and an amount of displacement in the K1 direction is 0.0194 mm. As regards this value, in the case of a conventional insert nut including no second region 32 at an inner peripheral portion, the amount of displacement in the K1 direction is 0.0112 mm, and therefore, the value in the case where the second region 32 is provided at the inner peripheral portion is 1.73 times the value in the case of the conventional insert nut, so that an effect of the present invention was confirmed.

Figure 4:
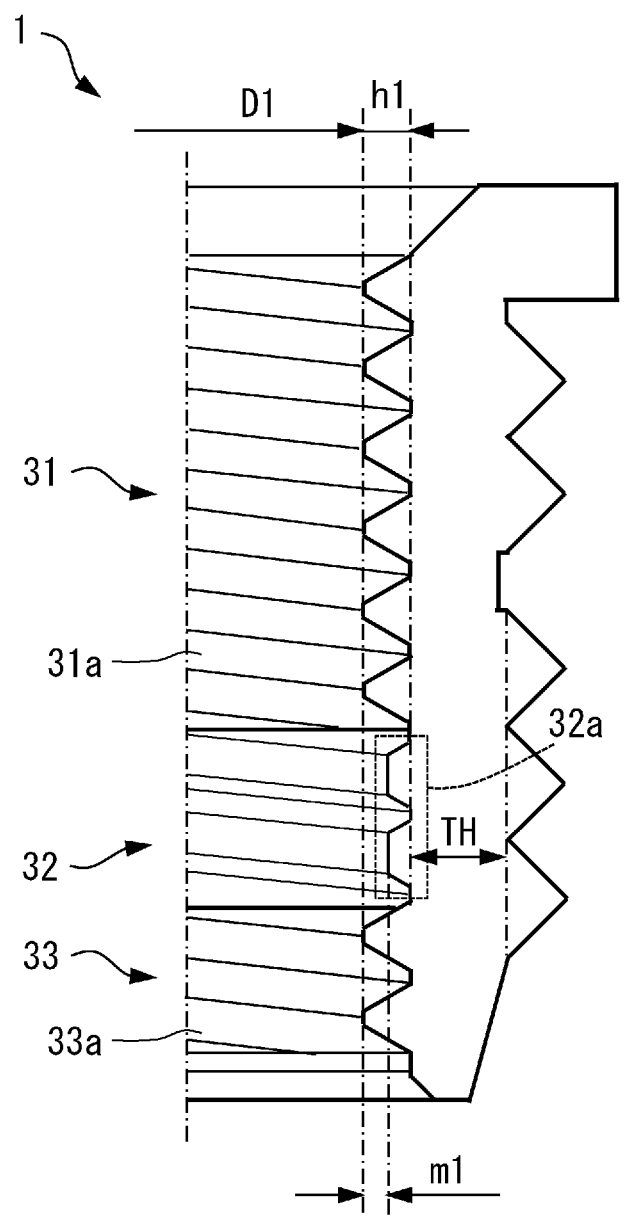
FIG. 4 is a schematic sectional view of an insert nut in a modified embodiment of First Embodiment.

Further, in this embodiment, the inner diameter d1 of the second region 32 was 93.0 mm, but a difference between the inner diameter d1 and the inner diameter D1=φ2.459 mm (in the case of the M3 screw) of each of the female screw portions 31a and 33a, i.e., a recessed amount h2 is (3 mm−2.459 mm)/2, which is approximately equals to 0.27 mm. Here, a processing tolerance of this portion is ±0.1 mm, and as a tolerance of the inner diameter D1 of each of the female screw portions 31a and 33a, a tolerance grade 7 (tolerance width=0.18 mm, radius=0.09 mm: ±0.045) of the tolerances of the female screw inner diameter shown in Table 3 of JIS B0209-1 is employed. Then, when the tolerance in the above-described recessed amount h2 is obtained as a root-mean-square value, the tolerance in the recessed amount h2 is $1.2 \times 1.3 \times (0.1^2 + 0.045^2)^{1/2}$, which is approximately equal to 0.17. For this reason, the recessed amount h2 in the second region 32 is 0.27 mm±0.17 mm, and thus is a value in a range from 0.10 mm to 0.44 mm. In the case where the value of the recessed amount h2 in the second region 32 is a minimum of 0.10 mm, as shown in FIG. 4, a projected portion 32a having a shape such that a top portion of the screw thread of the female screw is cut away by m1 with respect to a radial direction is formed. Also in this case, the bolt 50 is insertable into and removable from the second region 32, so that an effect of this embodiment can be achieved.

That is, when the bolt 50 is fastened, by the influence of the second region 32 formed at the hole portion 20, the shape of the screw thread of the third female screw portion 33a in the top side is readily displaced inwardly (toward an axial center), and by this biting, a phenomenon that the bolt 50 is rotated and loosen is suppressed. This is phenomenon is conspicuous in the case where the material of the insert nut 1 is liable to be deformed, i.e., in the case where longitudinal elastic modulus E1 of the insert nut 1 is smaller than longitudinal elastic modulus E2 of the bolt 50 used (E1<E2).

Next, preferred ranges of the respective dimensions of the second region 32 will be described with reference to FIG. 1. In the following, the preferred ranges of a thickness TH, the inner diameter (diameter) d1 and an axial direction length of the second region 32 are set, but upper limit and lower limit values are not limited thereto.

First, the preferred range of the thickness TH of the second region 32 will be described. The thickness TH is ½ of a difference between the inner diameter d1 of the second region 32 and a valley diameter D3 of the knurling portions 21 and 22 formed at the outer peripheral surface, and may preferably be in the range from 0.3 mm to 2.7 mm. When the thickness TH is less than 0.3 mm, there is a possibility that the strength is insufficient, so that the lower limit may preferably be 0.3 mm. Further, when the thickness TH exceeds 2.7 mm, the third female screw portion 33a is not readily inclined in the arrow K1 direction, so that an effect of biting into the opposing screw thread surface of the bolt 50 becomes small, and therefore, the upper limit may preferably be 2.7 mm. The upper limit of the thickness TH of the recessed portion of the second region 32 also includes that in the case where the diameter of the cylindrical portion 2 of the insert nut 1 is equal to the flange diameter and the flange diameter is equal to an M3 TP screw head diameter.

In this embodiment, the female screw portions 31a and 33a are M3 screws, and therefore, the thickness TH was in the range from 0.3 mm to 2.7 mm, but when the screw is a screw having another size, the preferred range of the thickness TH is another range. For example, in the case where the valley diameter of the first female screw portion 31a is D2, the thickness TH may preferably be in a range of 0.1×D2 or more and 0.9×D2 or less.

Next, the preferred range of the inner diameter (diameter) d1 of the second region 32 will be described. The inner diameter d1 of the second region 32 may preferably be in the range from 92.7 mm to 93.4 mm from the viewpoint that an effect of the recessed portion is made maximum and in view of a balance with the strength. As the inner diameter d1 of the second region 32 becomes small (a height of the projected portion 32a becomes high), the third female screw portion 33a is not readily inclined in the arrow K1 direction, so that the effect of biting into the opposing screw thread surface of the bolt 50 becomes small, and therefore, the lower limit may preferably be φ2.7 mm. Further, when the inner diameter d1 of the second region 32 exceeds 93.4 mm, the thickness TH becomes thin and the strength lowers, and therefore, the upper limit may preferably be 93.4 mm. In the case where the inner diameter d1 of the second region 32 is smaller than 93.0 mm, i.e., in the case of 92.7 mm≤d1<93.0 mm, as in the case of the projected portion 32a shown in FIG. 4, the screw thread shape is a trapezoidal shape in cross section. The projected portion 32a has a maximum height when the inner diameter d1 is φ2.7 mm, and has a height which is 70% of a height of a normal screw thread height. In this case, the second region 32 has a minimum inner diameter d1 larger than (D1+2×h1×0.3).

The preferred range of the axial direction length of the second region 32 will be described. A lower limit length of the second region 32 with respect to an axial direction may preferably be, as a length in which the second region 32 does not engage with the screw thread of the bolt 50, a length corresponding to two pitches as described above by the formula 4. Further, an upper limit length of the second region 32 with respect to the axial direction increases together with an increase in length of the cylindrical portion 2, but may only be required to be distributed in proportions represented by the formulas 1 to 4, and may preferably be a length corresponding to ten pitches in a practical region. That is, the second region 32 may preferably have a length, with respect to the inserting direction, which is not less than the length corresponding to the two pitches and not more than the length corresponding to the ten pitches.

Next, a processing (machining) method of the insert nut 1 will be described. In general, the insert nut is manufactured from a round bar by lathe cutting. The shape, which is a shape peculiar to this embodiment, of the second region 32 of the insert nut 1 at the hole portion 20 may be machined when an inner peripheral diameter is machined (prepared hole machining of the female screw) before the female screw portions 31a and 33a are machined. Further, the insert nut 1 is manufactured by press working in some instances. Also in this case, when the inner peripheral surface of the insert nut 1 is machined, i.e., in step in which a cylindrical shape of a plate material is expanded by deep drawing, a prepared hole diameter portion before the female screw machining is recessed and machined in advance, or after the cylindrical shape is completed, the second region 32 at the hole portion 20 may also be machined by cutting.

Figure 5:
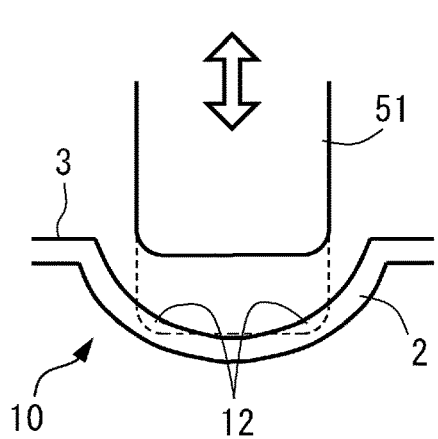
In FIG. 5, (a) to (d) are illustrations showing a procedure of forming the insert nut in First Embodiment by drawing, in which (a) shows a step of forming an upper end portion of a recessed portion, (b) shows a step of forming a lower end portion of the recessed portion, (c) shows a step of reducing a drawing diameter, and (d) shows a state in which the recessed portion has a cylindrical shape.
Figure 5:
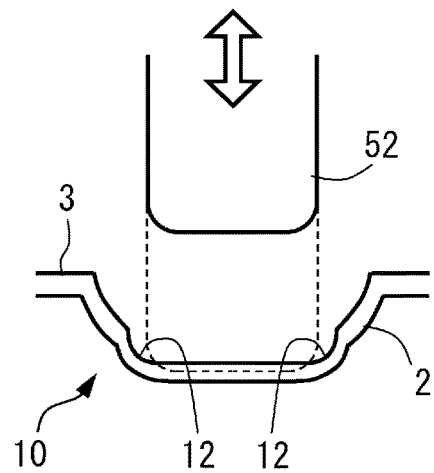
Figure 5:
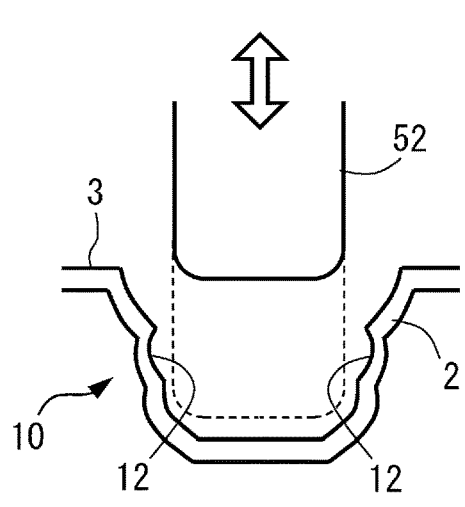
Figure 5:
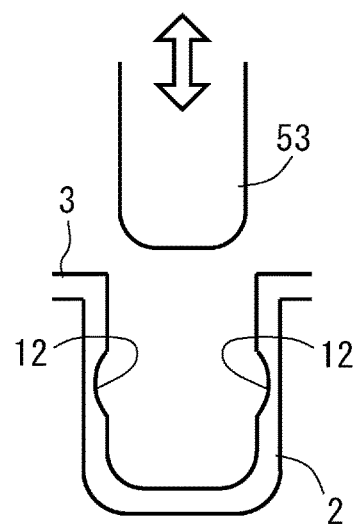

In this embodiment, a procedure of machining the insert nut 1 in the deep drawing step will be described while making reference to FIG. 5. In FIG. 5, (a) to (d) are schematic views for illustrating the procedure in the deep drawing step in the case where the insert nut 1 is subjected to the press working, and are extracted views showing a step of forming the second region 32 which is a feature of the present invention. In general, in the case of a cylinder drawing step, depending on a plate thickness, a material and the like of a raw material, the number of steps is determined on the basis of a reasonable drawing rate (contraction percentage) or a reasonable re-drawing rate, so that a further drawing step may also be added among the steps of (a) to (d) of FIG. 5. In (a) to (d) of FIG. 5, only punches are illustrated for easy explanation, but in actuality, dies corresponding to the respective punches exist. Formation of the second region 32 as a part of the feature of the present invention can be carried out in a step other than the steps shown in (a) to (d) of FIG. 5. For example, a recessed shape of the cylindrical portion 2 at the inner peripheral surface can also be obtained by controlling a plate thickness of the press material in a small thickness so that the thickness of the cylindrical portion shape becomes thin due to an insufficient amount of the material at an end portion, i.e., in the neighborhood of the cylindrical portion 2 in the step of drawing the cylindrical portion 2 with the punch.

First, as shown in (a) of FIG. 5, after a material 10 is drawn from an outside in a semi-spherical shape, a small-diameter punch 51 is pressed against the material 10, so that a recessed portion 12 is formed. By an outer diameter of the punch 51 at this time, a position of an end portion (upper end portion) of the second region 32 in the flange 3 side is determined, and by a press-in amount of the punch 51, an original shape of the recessed portion 12 is determined. For example, with a larger outer diameter of the punch 51, the position of the inner end portion of the second region 32 approaches the flange 3 side, and with a larger press-in amount, a depth of the recessed portion 12 of the second region 32 becomes deeper.

Then, as shown in (b) of FIG. 5, a punch 52 which is smaller in diameter than the punch 51 used in a pre-step shown in (a) of FIG. 5 is pressed against an inside surface of the recessed portion 12, so that the shape of the recessed portion 12 is drawn. In this step, a position of another end portion (lower end portion remote from the upper end portion in the flange 3 side) is determined. For example, with a smaller outer diameter of the punch 52 in this step, the position of the lower end portion of the second region 32 is more spaced from the flange 3. Further, as shown in (c) of FIG. 5, the punch 52 is pressed and drawn in a cylindrical shape so that the recessed portion 12 of the second region 32 moves to a side wall. Then, as shown in (d) of FIG. 5, a punch R and a die R are appropriately set, so that a drawing diameter is gradually reduced in several batches and thus a drawing depth is increased, and then the cylindrical portion 2 is finally driven to a predetermined diameter and a predetermined depth.

At this time, at the inner peripheral surface of the cylindrical shape portion, the recessed portion 12 formed in the step of (a) and (b) of FIG. 5 is elongated in the drawing step and is left as a trace of a recessed side surface as shown in (d) of FIG. 5. Thereafter, the cylindrical portion 2 is subjected to knurling at the outer peripheral portion and is subjected to tapping at the inner peripheral portion, so that the recessed portion 12 finally constitutes a recessed-shape portion of the second region 32. According to the procedure of the cylinder drawing step shown in (a) to (d) of FIG. 5, in a series of drawing steps, the recessed portion 12 of the second region 32 may only be required to be shaped so as to be recessed and machined at the inside surface thereof. Therefore, the cylindrical portion 2 is not only formed by the drawing but also formed by pressing of the die during the drawing. For this reason, compared with another processing (machining) method, there is no need to perform step set-ups and steps, so that simplification of a machining operation and shortening of an operation time can be realized.

As described above, according to the insert nut 1 in this embodiment, the second region 32 has the minimum inner diameter d1 larger than (D1+2×h1×0.3), where D1 is the inner diameter of the first female screw portion 31*a* and h1 is the height of the screw thread of the female screw portion 31*a*. For this reason, during the fastening of the bolt 50, a phenomenon that the screw thread of the bolt 50 pulls the screw thread of the third female screw portion 33*a* generates, so that an angle of the screw thread shape readily changes further inwardly. As a result, the female screw portions 31*a* and 33*a* of the insert nut 1 firmly bite into the screw thread of the bolt 50, and therefore, a value of loosening torque of the bolt 50 increases, so that the bolt 50 is not readily loosened. As a result, without increasing the number of assembling steps and only by the general-purpose bolt 50, it is possible to reduce a degree of generation of loosening of the fastened bolt 50 due to disturbances such as vibration, a temperature change and the like of the fastened bolt 50.

Second Embodiment

Second Embodiment of the present invention will be specifically described with reference to FIGS. 6 to 8. This embodiment is different from First Embodiment in that a third female screw portion 133*a* of a third region 133 has a small diameter in a lower end side and that the third region 133 is divided into a slit 105 and a leg portion 106. However, other constituent elements are similar to those in First Embodiment and therefore are represented by the same reference numerals or symbols, and will be omitted from detailed description. Further, in this embodiment, an insert nut 101 constitutes a fastening device 170 in combination with the bolt 50 similarly as in First Embodiment, and is used during fastening and fixing of the fastened member 60.

At a hole portion 120 of the insert nut 101, an M3 standard female screw portion 131*a* of a first region 131 and an M3 standard female screw portion 133*a* of a third region 133 which are formed by rolled thread top or cut thread tap, and a second region 132 provided between these regions 131 and 133 are disposed. As shown in FIG. 8, a cylindrical portion 102 includes the slit 105 and the leg portion 106 which are formed along the axial direction from the lower end portion of the insert nut 101 with respect to the inserting direction of the bolt 50. Specifically, the lower end portion of the insert nut 101 is divided into four leg portions 106 by the slit 105 disposed every 90° in angle with a height L2 and a width N2.

Figure 6:
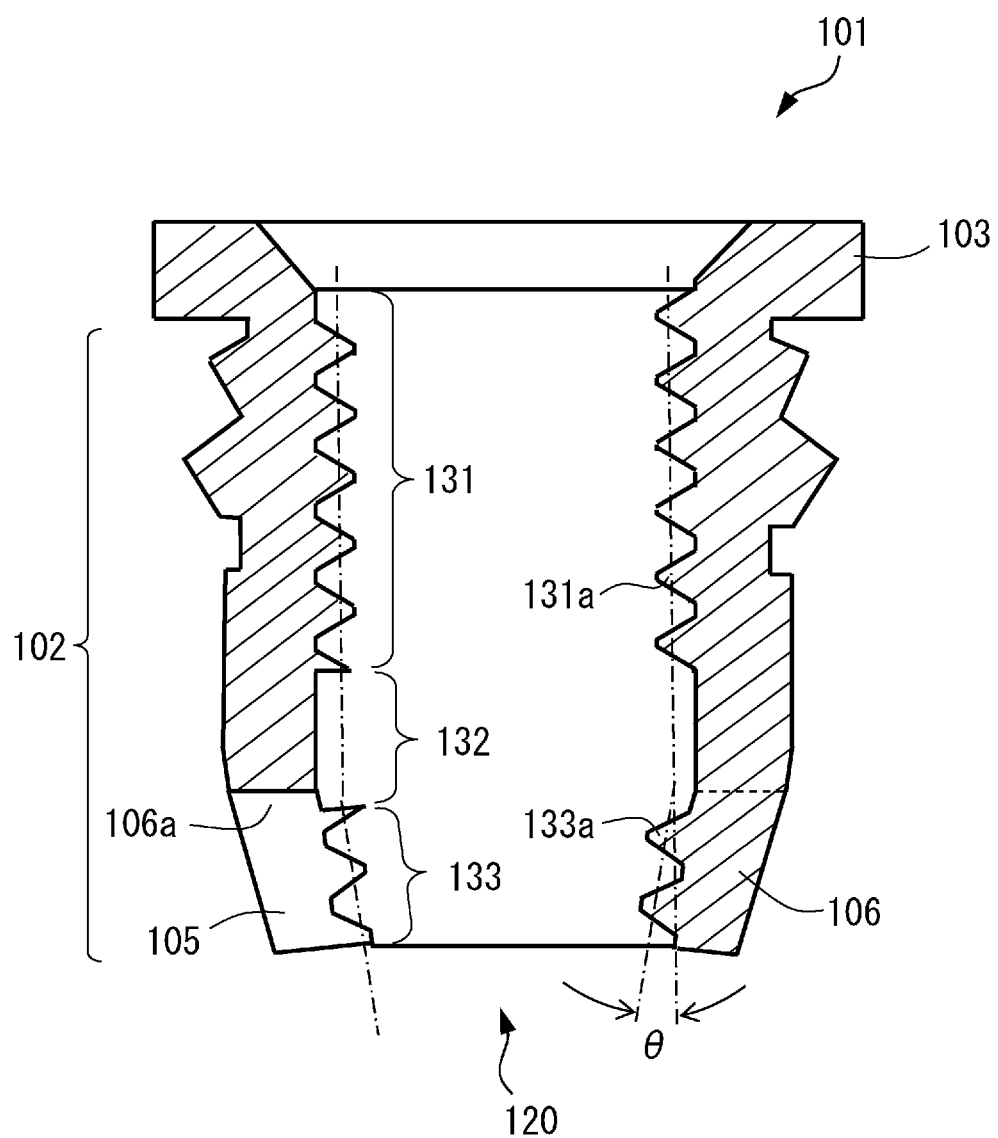
FIG. 6 is a schematic sectional view of an insert nut according to Second Embodiment.

Further, as shown in FIG. 6, the third female screw portion 133*a* includes at least a portion thereof smaller in diameter than the first female screw portion 131*a*. The third female screw portion 133*a* has a gradient such that the diameter thereof is large in a first female screw portion 131*a* side and is small in a side opposite from the first female screw portion 131*a* side. In this embodiment, the third female screw portion 133*a* is inclined in a radially center direction from a bent portion 106*a* in the neighborhood of a base of the leg portion 106 by an angle θ=2°.

An action when the fastened member 60 is fastened and fixed to the insert nut 101 tapered at the lower end portion by 2° and the base material 40 holding the insert nut 101, by the fastening device 170 constituted by the insert nut 101 together with the bolt 50 will be described with reference to FIG. 7.

Figure 7:
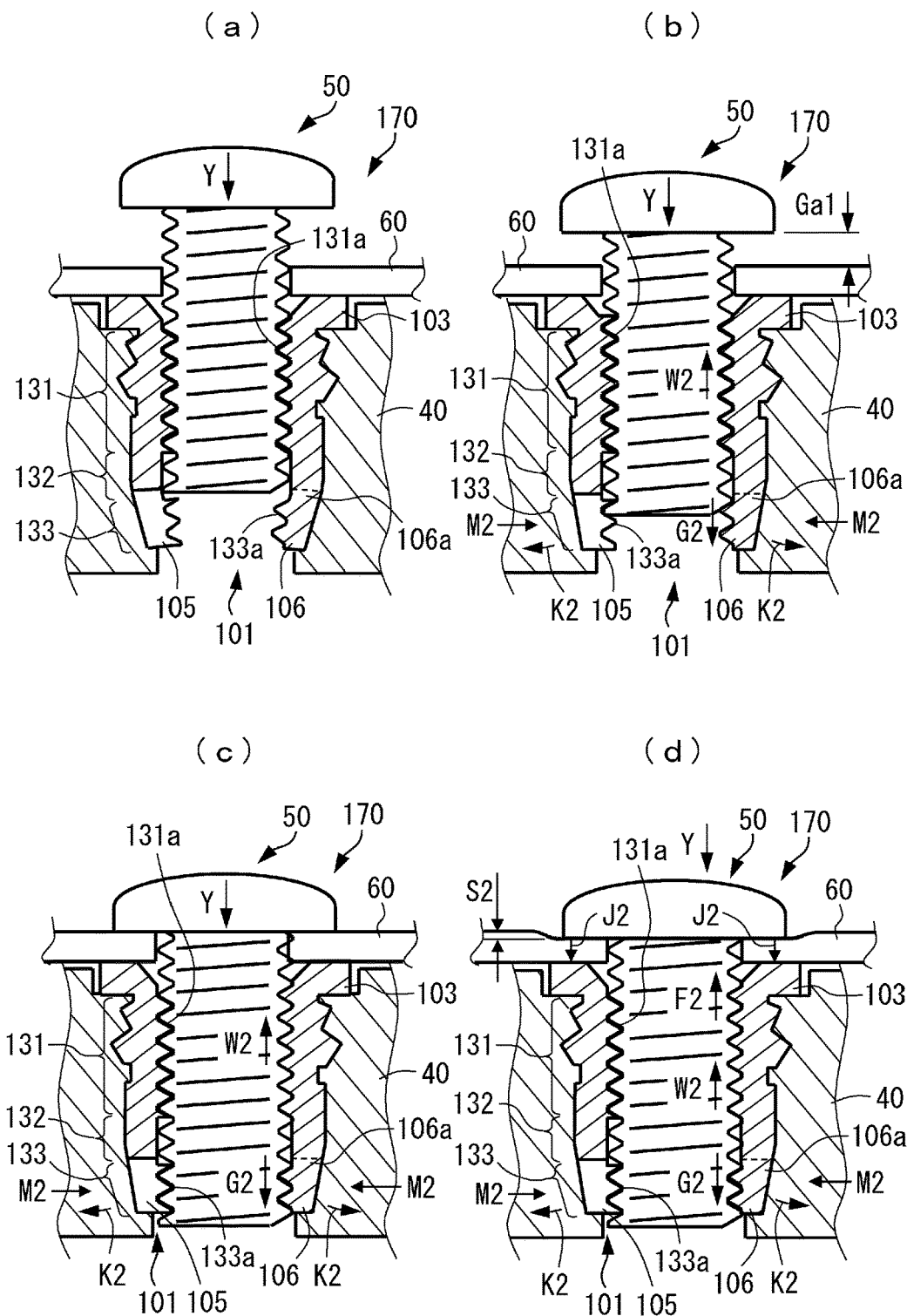
In FIG. 7, (a) to (d) are sectional views of a fastening device in which a bolt is threadably engaged with the insert nut in Second Embodiment, herein (a) shows a state before the bolt reaches a third region, (b) shows a state after the bolt reached the third region and before a head portion of the bolt contacts a fastened member, (c) shows a state before the head portion of the bolt contacting the fastened member is fastened, and (d) shows a state after the bolt is fastened.

In (a) of FIG. 7, an initial stage in which the bolt 50 is rotated and inserted into the insert nut 101 in an arrow Y direction is shown. The screw thread of the bolt 50 is threadably engaged with only the first female screw portion 131*a* of the insert nut 101, and the head portion of the bolt 50 does not contact the fastened member 60, and therefore there is no interaction, such as compressive force or tensile force, between the bolt 50 and the insert nut 101.

In (b) of FIG. 7, when the leading end portion of the bolt 50 reaches and starts engagement with the third female screw portion 133*a*, the leading end portion of the bolt 50 also engages with the first female screw portion 131*a* simultaneously. A gap between the head portion of the bolt 50 and the fastened member 60 at this time is Ga1. When the bolt 50 is threadably engaged with the third female screw portion 133*a*, the leg portion 106 is inclined by the angle θ=2°, and therefore, the screw thread of the third female screw portion 133*a* enters the bolt 50 side compared with an original position. For this reason, the third female screw portion 133*a* of the insert nut 101 is expanded by the bolt 50, so that tensile stresses such as stress W2 and stress G2 generate. At the same time, as regards the bolt 50, compressive stresses generates in directions opposite to those of the tensile stresses.

As shown in (c) of FIG. 7, when the head portion of the bolt 50 starts to contact the fastened member 60 and the gap Ga1 in (b) of FIG. 7 reaches zero, the fastening of the fastened member 60 by the insert nut 101 and the bolt 50 starts. From the state of (c) of FIG. 7, when the bolt 50 is further fastened as shown in (d) of FIG. 7, an upper surface of the fastened member 60 is compressively deformed in a depth S2 although an amount of deformation is small. The fastened member 60 causes, as a reaction force thereof, a downward compressive load J2 to act on the upper surface of the insert nut 101. The bolt 50 causes an upward load F2 to act on the first female screw portion 131*a* of the insert nut 101 so as to achieve a balance between the downward load J2 and the upward load F2.

In this embodiment, external forces acting on the insert nut 101 are summarized as the following two points.
  1. Fastening force of fastened member 60: J1=F2
  2. Tensile force between first female screw portion 131*a* and third female screw portion 133*a*: W2=G2

Of these forces, the fastening force (J2=F2) of the fastened member 60 gradually lowers due to various disturbance factors from an ambient environment. Further, at the instant when the fastening depth S2 shown in (d) of FIG. 7 reaches zero as shown in (c) of FIG. 7, also the fastening force (J2=F2) becomes zero. However, in this embodiment, separately from the fastening force (J2=F2) of the fastened member 60, the insert nut 101 receives the tensile force (W2=G2) from the bolt 50, and therefore, the insert nut 101 is not readily subjected to a fluctuation also due to the above-described various disturbance factors from the environment. Further, when the range of about 1 mm is ensured for the third female screw portion 133*a*, even against a fluctuation in height position of the bolt 50, robustness becomes very high, so that reliability can be improved.

As shown in (b) of FIG. 7, by the action of the tensile force G2 applied to the third female screw portion 133*a*, the respective leg portions 106 are likely to be deformed in the arrow K2 direction with the associated bent portions 106*a* as centers. On the other hand, the surrounding base material 40 imparts a reaction force M2 for preventing this deformation. By this reaction force M2, a retention property of the insert nut 101 itself is improved.

A result obtained by subjecting the tensile force (W2=G2), the fastening force (J2=F2) of the fastened member 60 and the reaction force M2 by the base material 40 to a simulation using a structural analysis will be described. The fastening force (J2=F2) of the fastened member 60 varies depending on setting of the fastening torque (rotational torque) of the bolt 50, and therefore, the fastening torque is set at 0.6 N.m.

First, materials of the respective members as a precondition of the simulation will be described. As the material of the insert nut 101, the 5000 series aluminum alloy which is excellent in workability (processing property) by adding magnesium in a relatively large amount in order to enhance strength while suppressing a deterioration of corrosion resistance or the like and which is widely used as parts of vehicles, shipping, building, general machines and the like is used. Or, the material of the insert nut 101 is not limited to the 5000 series aluminum alloy, but may also be, for example, brass which is excellent in corrosion resistance, drawability and rolling property and which is easily processed. As the material of the fastened member 60, the zinc-electroplated steel plate which possesses features such that compared with a general-purpose steel plate, it is excellent in corrosion resistance, has a very good workability, is not readily damaged, is excellent in coating property, is inexpensive and can be mass-produced and which has become widespread is used. As the material of the base material 40, it is possible to use various engineering plastics such as ABS, PC and PET, but there is particularly no need to set the material of the base material 40 in execution of the simulation.

A result of the simulation was as follows.
Fastening force: (J2=F2=1325 N)
Tensile force: (W2=G2=120 N)
The reaction force M2 by the base material 40 was as follows.
M2=13 N As described above, also according to the insert nut 101 in this embodiment, the second region 132 has the minimum inner diameter d1 larger than (D1+2×h1×0.3), where D1 is the inner diameter of the first female screw portion 131a and h1 is the height of the screw thread of the female screw portion 131a. Moreover, the third female screw portion 133a has the small diameter at the lower end thereof and is expanded by being threadably engaged with the bolt 50, so that stresses with respect to opposite directions along the axial direction are generated between the first female screw portion 131a and the third female screw portion 133a. For this reason, it is possible to provide the insert nut 101 in which the bolt 50 is not readily loosened even due to the various disturbance factors from the environment. Further, loosening prevention of the bolt 50 is not realized in the bolt 50 side and is not realized by a kind of a loosening-preventing agent, and therefore, the bolt 50 also has an advantage that the bolt 50 has a multiplicity of uses. Further, by the reaction force M2, the retention property of the insert nut 101 itself is also improved.

Third Embodiment

Figure 9:
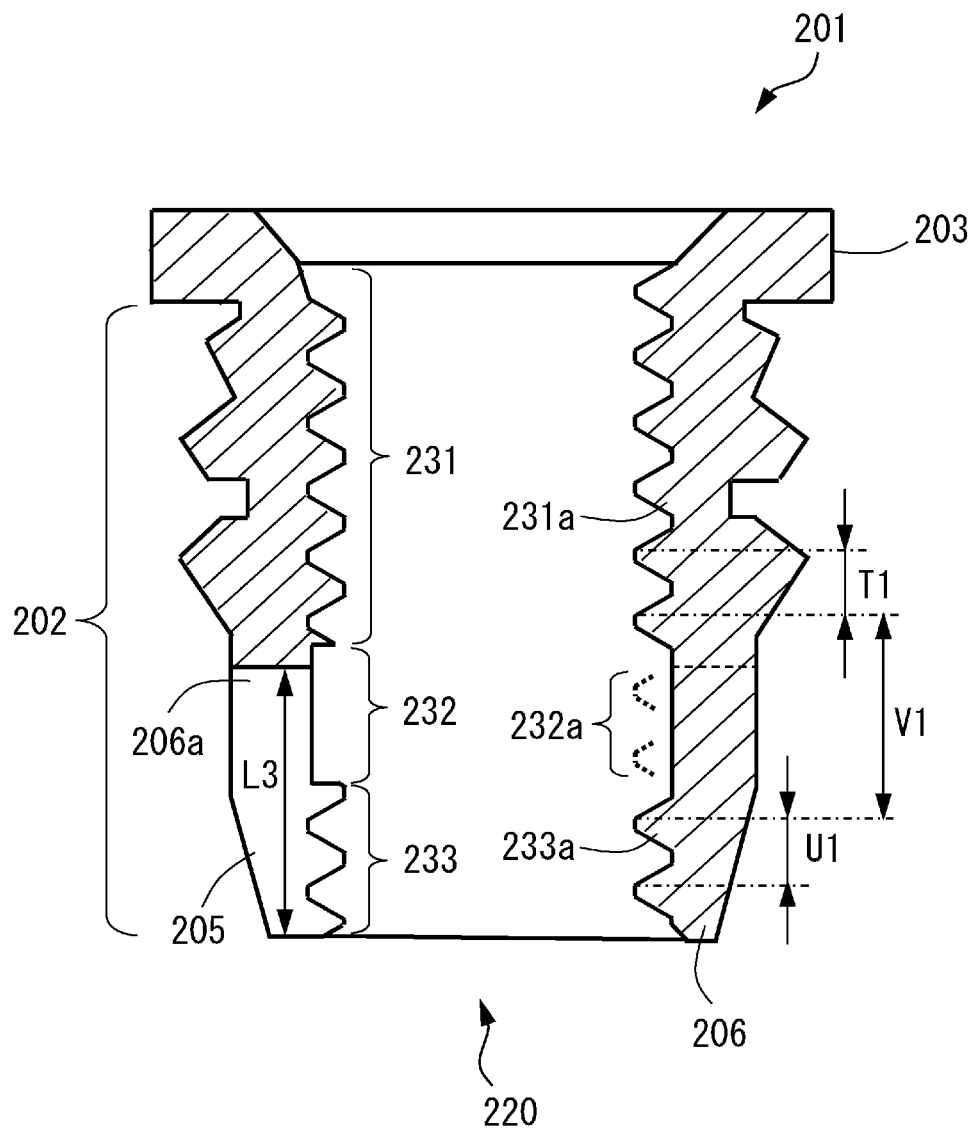
FIG. 9 is a schematic sectional view of an insert nut according to Second Embodiment.

Third Embodiment of the present invention will be specifically described with reference to FIGS. 9 and 10. This embodiment is different from First Embodiment in that a first female screw portion 231a of a first region 231, and a third female screw portion 233a of a third region 33 are made slightly different from each other in pitch phase. However, other constituent elements are similar to those in First Embodiment and therefore are represented by the same reference numerals or symbols, and will be omitted from detailed description. Further, in this embodiment, an insert nut 201 constitutes a fastening device 270 in combination with the bolt 50 similarly as in First Embodiment, and is used during fastening and fixing of the fastened member 60.

At a hole portion 220 of a cylindrical portion 202 of the insert nut 201, an M3 standard female screw portion 231a and an M3 standard female screw portion 233a which are formed by rolled thread top or cut thread tap, and a second region 232 provided between the first region 231 and the third region 233. In this embodiment, as shown in FIG. 9, a female screw portion is formed over an entirety of the hole portion 220, and thereafter, a screw thread 232a of the second region 232 is cut off by cutting, so that the first region 231, the second region 232 and the third region 33 are formed.

The M3 standard first and third female screw portions 231a and 233a have pitches T1 and U1, respectively. Further, a pitch V1 of the portion between the first female screw portion 231a and the third female screw portion 233a is to be V1=0.5×n (mm), where n is an integer of n>0. However, after the cutting for cutting the screw thread 232a of the second region 232, the second region 232 is compressed in the axial direction by the press working, whereby a dimension is reduced by about 0.01 mm. As a result, V1=0.5×n−Δp (mm) is satisfied. Here, Δp represents a compression amount of about 0.01 mm in the second region 232. That is, the third female screw portion 233a has the same pitch as the first female screw portion 231a and is disposed with a pitch phase deviated by a predetermined length from a pitch phase of the first female screw portion 231a.

Figure 8:
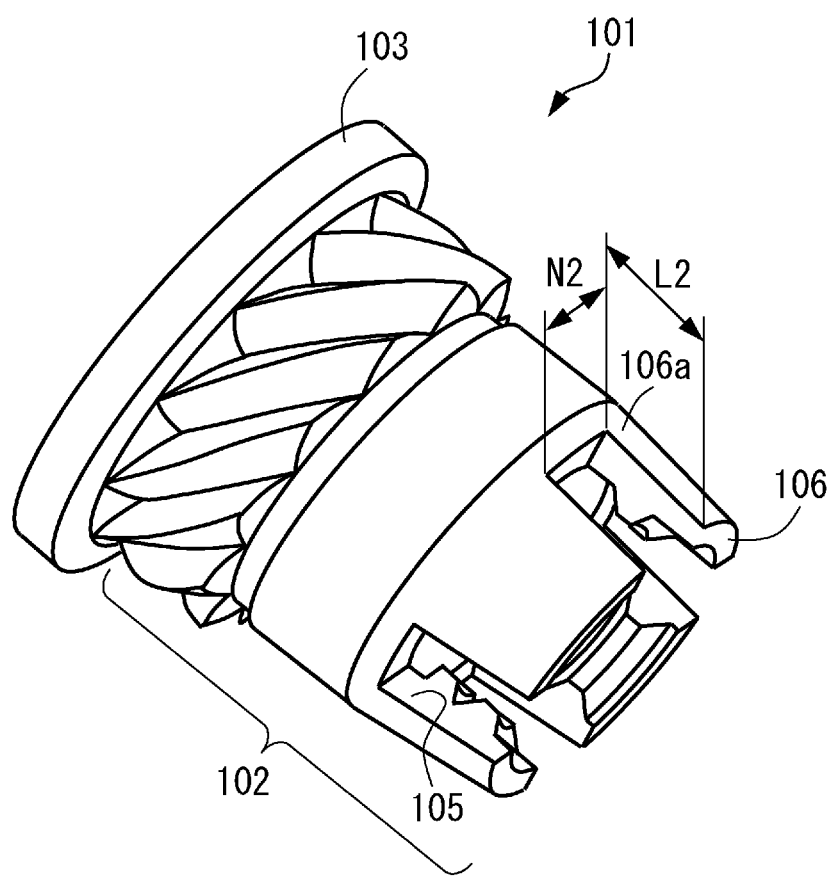
FIG. 8 is a schematic perspective view of the insert nut in Second Embodiment.

Further, the lower end portion of the insert nut 201 is divided into leg portions 206 by a slit 205 similarly as in Second Embodiment (FIG. 8). Each of the leg portions 206 has a length of L3 and includes a base portion 206a at an uppermost portion thereof.

An action when the fastened member 60 is fastened and fixed to the insert nut 201 and the base material 40 holding the insert nut 201, by the fastening device 270 constituted by the insert nut 201 together with the bolt 50 will be described with reference to FIG. 10.

Figure 10:
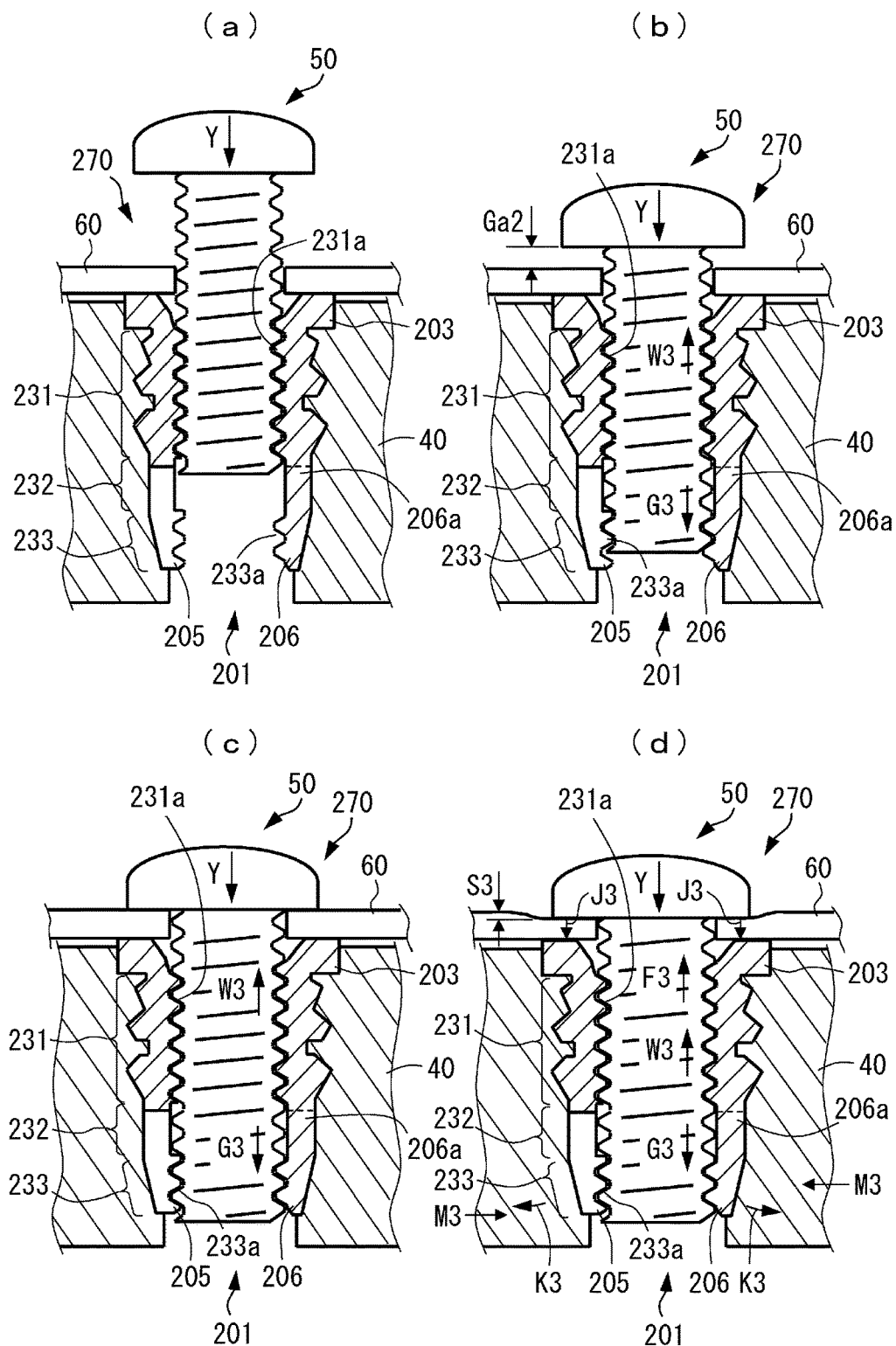
In FIG. 10, (a) to (d) are sectional views of a fastening device in which a bolt is threadably engaged with the insert nut in Third Embodiment, herein (a) shows a state before the bolt reaches a third region, (b) shows a state after the bolt reached the third region and before a head portion of the bolt contacts a fastened member, (c) shows a state before the head portion of the bolt contacting the fastened member is fastened, and (d) shows a state after the bolt is fastened.

In (a) of FIG. 10, an initial stage in which the bolt 50 is rotated and inserted into the insert nut 201 in an arrow Y direction is shown. The screw thread of the bolt 50 is threadably engaged with only the first female screw portion 231a of the insert nut 201, and the head portion of the bolt 50 does not contact the fastened member 60, and therefore there is no interaction, such as compressive force or tensile force, between the bolt 50 and the insert nut 201.

In (b) of FIG. 10, when the leading end portion of the bolt 50 reaches and starts engagement with the third female screw portion 233a, the leading end portion of the bolt 50 also engages with the first female screw portion 231a simultaneously. A gap between the head portion of the bolt 50 and the fastened member 60 at this time is Ga2. As described above, the first female screw portion 231a and the third female screw portion 233a, cause a slight phase deviation of about 0.01 mm in a negative side. For this reason, the first female screw portion 231a and the third female screw portion 233a of the insert nut 201 pulled and elongated by the bolt 50, so that tensile stresses such as stress W3 and stress G3 generate. As regards the bolt 50, compressive stresses generates in directions opposite to those of the tensile stresses.

As shown in (c) of FIG. 10, when the head portion of the bolt 50 starts to contact the fastened member 60 and the gap Ga2 in (b) of FIG. 10 reaches zero, the fastening of the fastened member 60 by the insert nut 201 and the bolt 50 starts. From the state of (c) of FIG. 10, when the bolt 50 is further fastened as shown in (d) of FIG. 10, an upper surface of the fastened member 60 is compressively deformed in a depth S3 although an amount of deformation is small. The fastened member 60 causes, as a reaction force thereof, a downward compressive load J3 to act on the upper surface of the insert nut 201. The bolt 50 causes an upward load F3 to act on the first female screw portion 231a of the insert nut 201 so as to achieve a balance between the downward load J3 and the upward load F3.

In this embodiment, external forces acting on the insert nut 201 are summarized as the following two points.
1. Fastening force of fastened member 60: J2=F3
2. Tensile force between first female screw portion 131a and third female screw portion 133a: W3=G3

Of these forces, the fastening force (J3=F3) of the fastened member 60 gradually lowers due to various disturbance factors from an ambient environment. Further, at the instant when the fastening depth S2 shown in (d) of FIG. 10 reaches zero as shown in (c) of FIG. 10, also the fastening force (J3=F3) becomes zero. However, in this embodiment, separately from the fastening force (J3=F3) of the fastened member 60, the insert nut 201 receives the tensile force (W3=G3) from the bolt 50, and therefore, the insert nut 201 is not readily subjected to a fluctuation also due to the above-described various disturbance factors from the environment. Further, when the range of about 1 mm is ensured for the third female screw portion 233a, even against a fluctuation in height position of the bolt 50, robustness becomes very high, so that reliability can be improved.

As shown in (b) of FIG. 10, by the action of the tensile force G3 applied to the third female screw portion 233a, the respective leg portions 206 are likely to be deformed in the arrow K3 direction with the associated base portions 206a as centers. On the other hand, the surrounding base material 40 imparts a reaction force M3 for preventing this deformation. By this reaction force M3, a retention property of the insert nut 201 itself is improved.

A result obtained by subjecting the tensile force (W3=G3), the fastening force (J3=F3) of the fastened member 60 and the reaction force M3 by the base material 40 to a simulation using a structural analysis will be described. The fastening force (J3=F3) of the fastened member 60 varies depending on setting of the fastening torque (rotational torque) of the bolt 50, and therefore, the fastening torque is set at 0.6 N.m.

First, materials of the respective members as a precondition of the simulation will be described. As the material of the insert nut 101, the 5000 series aluminum alloy which is excellent in workability (processing property) by adding magnesium in a relatively large amount in order to enhance strength while suppressing a deterioration of corrosion resistance or the like and which is widely used as parts of vehicles, shipping, building, general machines and the like is used. Or, the material of the insert nut 101 is not limited to the 5000 series aluminum alloy, but may also be, for example, brass which is excellent in corrosion resistance, drawability and rolling property and which is easily processed. As the material of the fastened member 60, the zinc-electroplated steel plate which possesses features such that compared with a general-purpose steel plate, it is excellent in corrosion resistance, has a very good workability, is not readily damaged, is excellent in coating property, is inexpensive and can be mass-produced and which has become widespread is used. As the material of the base material 40, it is possible to use various engineering plastics such as ABS, PC and PET, but there is particularly no need to set the material of the base material 40 in execution of the simulation.

A result of the simulation was as follows.
Fastening force: (J3=F3=1325 N)
Tensile force: (W3=G3=100 N)
The reaction force M3 by the base material 40 was as follows.
M3=4.9 N As described above, also according to the insert nut 201 in this embodiment, the second region 232 has the minimum inner diameter d1 larger than (D1+2×h1×0.3), where D1 is the inner diameter of the first female screw portion 231a and h1 is the height of the screw thread of the female screw portion 231a. Moreover, the pitch phases of the first female screw portion 231a and the third female screw portion 233a are deviated from each other, so that stresses with respect to opposite directions along the axial direction are generated between the first female screw portion 231a and the third female screw portion 233a. For this reason, it is possible to provide the insert nut 201 in which the bolt 50 is not readily loosened even due to the various disturbance factors from the environment. Further, loosening prevention of the bolt 50 is not realized in the bolt 50 side and is not realized by a kind of a loosening-preventing agent, and therefore, the bolt 50 also has an advantage that the bolt 50 has a multiplicity of uses. Further, by the reaction force M3, the retention property of the insert nut 201 itself is also improved.

According to the present invention, in the insert nut, the second region provided between the first region and the third region has the minimum diameter larger than (D1+2×h1×0.3). As a result, without increasing the number of assembling steps and while using only by the general-purpose bolt, it is possible to reduce a degree of generation of loosening of the fastened bolt 50 due to disturbances such as vibration, a temperature change and the like of the fastened bolt.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-127008 filed on Jun. 27, 2016, which is hereby incorporated by reference herein in its entirety.

What is claimed is:

1. An insert nut comprising:
a cylindrical portion into which a screw is removably insertable;
a first portion provided in an inner periphery of said cylindrical portion and provided with a female screw portion threadably engageable with the screw, wherein D1 is an inner diameter of the female screw portion in the first portion at a screw thread position and h1 is a height of a screw thread of the female screw portion in the first portion;
a second portion provided in an inner periphery of said cylindrical portion and disposed in a downstream side of the first portion with respect to an inserting direction of the screw, wherein the second portion has a minimum inner diameter larger than D1+2×h1×0.3; and
a third portion provided in an inner periphery of said cylindrical portion and disposed in the downstream side of the second portion with respect to the inserting direction of the screw, the third portion being provided with a female screw portion threadably engageable with the screw, wherein a minimum inner diameter of the third portion is smaller than that of the second portion.

2. An insert nut according to claim 1, wherein the second portion has the minimum inner diameter larger than an effective diameter of the female screw portion in the first portion.

3. An insert nut according to claim 1, wherein the second portion has a length, with respect to the inserting direction, which is not less than a length corresponding to two pitches of the female screw portion in the first portion, and which is not more than a length corresponding to ten pitches of the female screw portion in the first portion.

4. An insert nut according to claim 1, wherein the second portion has a thickness which is not less than 0.1×D2 and not more than 0.9×D2, where D2 is a diameter of a valley portion of the female screw portion in the first portion.

5. An insert nut according to claim 1, wherein the second portion has a circumferential surface shape.

6. An insert nut according to claim 1, wherein the second portion includes a projected portion having a screw thread shape.

7. An insert nut according to claim 1, wherein the female screw portion in the third portion includes at least a portion smaller in diameter than the female screw portion in the first portion.

8. An insert nut according to claim 7, wherein the female screw portion in the third portion has a gradient such that the female screw portion includes a length diameter portion in a side toward the female screw portion in the first portion and a small diameter portion in a side opposite from the female screw portion the first portion.

9. An insert nut according to claim 1, wherein the female screw portion in the third portion has the same diameter, the same pitch and the same pitch phase as those of the female screw portion in the first portion.

10. An insert nut according to claim 1, wherein the female screw portion in the third portion has the same pitch as that of the female screw portion in the first portion and is provided so that the pitches of the female screw portions in the first and third portions are deviated from each other by a predetermined length.

11. An insert nut according to claim 1, wherein said cylindrical portion is provided with a slit formed along an axial direction from a free end portion with respect to the inserting direction of the screw.

12. An insert nut according to claim 1, wherein said cylindrical portion is formed of an aluminum alloy.

13. An insert nut according to claim 1, wherein said cylindrical portion is formed by drawing, and the second portion is formed by pressing with a punch during the drawing.

14. A fastening device comprising:
an insert nut according to claim 1; and
a screw configured to be assembled with said insert nut.

15. A fastening device according to claim 14, wherein said fastening device satisfies a relationship of E1<E2, where E1 is longitudinal elastic modulus of said insert nut and E2 is a longitudinal elastic modulus of said screw.

16. A fastening device according to claim 14, further comprising:
a base material formed of a resin in which said insert nut is embedded so that an upper surface of said insert nut is exposed; and
a fastened member fixed to said base material by said insert nut and the screw.

17. An insert nut according to claim 1, further comprising:
a flange provided with an inserting opening into which the screw is inserted; and
an uneven shape portion provided at an outer peripheral surface of said cylindrical portion in a downstream side of said flange with respect to the inserting direction of the screw.

18. An insert nut according to claim 17, wherein said uneven shape portion includes a first knurling portion and a second knurling portion of which a twist direction is different from that of said first knurling portion.

19. An insert nut comprising:
a cylindrical portion into which a screw is removably insertable,
a first portion provided in an inner periphery of said cylindrical portion and provided with a female screw portion threadably engageable with the screw;
a second portion provided in an inner periphery of said cylindrical portion and disposed in a downstream side of the first portion with respect to an inserting direction of the screw; and
a third portion provided in an inner periphery of said cylindrical portion and disposed in the downstream side of the second portion with respect to the inserting direction of the screw, the third portion been provided with a female screw portion threadably engageable with the screw, wherein a minimum inner diameter of the second portion is larger than that of the first portion and is larger than that of the third portion.

20. An insert nut according to claim 19, wherein the second portion has a length, with respect to the inserting direction, which is not less than a length corresponding to two pitches of the female screw portion in the first portion, and which is not more than a length corresponding to ten pitches of the female screw portion in the first portion.

* * * * *